(12) United States Patent
Okonski et al.

(10) Patent No.: US 6,532,854 B2
(45) Date of Patent: *Mar. 18, 2003

(54) CUTTING DIE CLAMPING MECHANISM

(75) Inventors: Frank Okonski, Harwood Heights, IL (US); Edward Porento, Sr., Des Plaines, IL (US)

(73) Assignee: Best Cutting Die Company, Chicago, IL (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/967,987

(22) Filed: Nov. 12, 1997

(65) Prior Publication Data

US 2002/0011140 A1 Jan. 31, 2002

Related U.S. Application Data

(63) Continuation-in-part of application No. 08/184,654, filed on Jan. 21, 1994, now abandoned.

(51) Int. Cl.[7] .................................................. B26D 1/62
(52) U.S. Cl. .................. 83/698.41; 83/698.31
(58) Field of Search ..................... 83/698.31, 698.42, 83/698.51, 698.61, 505, 346, 347, 98, 100, 698.41, 663, 669

(56) References Cited

U.S. PATENT DOCUMENTS

| 642,220 A | 1/1900 | Green |
| 658,025 A | * 9/1900 | Smith ........................ 493/342 |
| 884,218 A | * 4/1908 | Schwarz ...................... 83/659 |
| 1,168,767 A | 1/1916 | Unruh |
| 1,618,191 A | 2/1927 | Hemberger |
| 1,746,048 A | 2/1930 | Novick |
| 1,766,244 A | 6/1930 | Cumfer |
| 1,777,285 A | 10/1930 | Adsit |
| 1,927,728 A | 9/1933 | Wolff |
| 2,055,295 A | 9/1936 | Kessler ..................... 101/415.1 |
| 2,277,405 A | 3/1942 | McKiernan .................. 101/171 |
| 2,299,650 A | 10/1942 | Parks, Jr. et al. ............. 164/68 |
| 2,386,147 A | 10/1945 | Sidebotham .................. 164/22 |
| 2,791,276 A | 5/1957 | Weller ........................ 164/206 |
| 2,837,025 A | 6/1958 | Pechy ..................... 101/415.1 |
| 2,898,854 A | 8/1959 | Crawford ................. 101/415.1 |
| 3,008,366 A | 11/1961 | Taylor, Jr. ..................... 83/346 |
| 3,032,152 A | 5/1962 | Titsler ......................... 189/36 |

(List continued on next page.)

FOREIGN PATENT DOCUMENTS

| CA | 743783 | 10/1966 |
| DE | 28 52 521 | 6/1979 |
| DE | 3544358 A | 6/1987 |
| EP | 0 312 422 A1 | 4/1989 |
| EP | 0 519 661 A1 | 12/1992 |
| GB | 1235372 | 6/1971 |
| GB | 1322090 | 7/1973 |
| GB | 2133734 A | 8/1984 |
| WO | WO 83/04004 | 11/1983 |

Primary Examiner—Allan N. Shoap
Assistant Examiner—Stephen Choi
(74) Attorney, Agent, or Firm—Michael Best & Friedrich, LLC

(57) ABSTRACT

A clamping mechanism is provided for clamping a cutting die to the die holder of a rotary cutting assembly used to cut a pattern in an envelope blank or the like. The clamping mechanism is adapted to fit within and cooperate with a groove of the die holder to clamp at least one of the ends of the cutting die therebetween for securing the cutting die to the holder. One embodiment of the clamping mechanism comprises a clamping bar and a position adjustment assembly for adjusting the vertical position of the clamping bar in the groove so as to accommodate different size cutting dies. Another embodiment of the clamping mechanism comprises a clamping bar which pivotably engages a slot disposed in the die holder.

9 Claims, 6 Drawing Sheets

U.S. PATENT DOCUMENTS

| | | | |
|---|---|---|---|
| 3,106,121 A | 10/1963 | Novick | 83/152 |
| 3,128,681 A | 4/1964 | Miller | 93/58 |
| 3,172,321 A | 3/1965 | Schrader | 83/100 |
| 3,190,194 A | 6/1965 | Kirby et al. | 93/58.2 |
| 3,198,093 A | 8/1965 | Kirby et al. | 93/58.2 |
| 3,209,630 A | 10/1965 | McCartan | 83/100 |
| 3,244,335 A | 4/1966 | Downie | 225/1 |
| 3,257,885 A | 6/1966 | Hornung | 83/346 |
| 3,270,602 A | 9/1966 | Kirby et al. | 83/102 |
| 3,289,513 A | 12/1966 | Johnson et al. | 83/344 |
| 3,460,443 A | 8/1969 | Sarka et al. | 93/58.2 |
| 3,522,754 A | 8/1970 | Sauer | |
| 3,523,474 A | 8/1970 | Kinslow, Jr. | 83/40 |
| 3,527,127 A | 9/1970 | Stovall | 83/23 |
| 3,530,794 A | 9/1970 | Ritzerfeld | 101/216 |
| 3,533,355 A | 10/1970 | Wall | 101/415.1 |
| 3,578,761 A | 5/1971 | Sarka | 83/343 |
| 3,602,079 A | 8/1971 | Carlson | 83/67 |
| 3,602,970 A * | 9/1971 | Smith | 492/22 |
| 3,618,438 A | 11/1971 | Simson | 83/117 |
| 3,668,752 A | 6/1972 | Clifton et al. | 29/124 |
| 3,670,646 A | 6/1972 | Welch Jr. | 101/382 MV |
| 3,709,077 A | 1/1973 | Trogan et al. | 83/152 |
| 3,730,092 A | 5/1973 | Pickard et al. | 101/415.1 |
| 3,744,384 A | 7/1973 | Jarritt et al. | 93/58.2 R |
| 3,752,042 A | 8/1973 | Castille | 93/58.2 R |
| 3,789,715 A | 2/1974 | Schuchardt et al. | 83/663 |
| 3,797,351 A | 3/1974 | Jones, Jr. | 83/698 |
| 3,810,055 A | 5/1974 | Wright | 335/285 |
| 3,823,633 A | 7/1974 | Ross | 83/346 |
| 3,824,926 A | 7/1974 | Fukuyama | 101/378 |
| 3,824,927 A | 7/1974 | Pugh et al. | 101/378 |
| 3,850,059 A | 11/1974 | Kang | |
| 3,865,164 A * | 2/1975 | Sybertz | 144/230 |
| 3,882,750 A * | 5/1975 | Duckett et al. | 83/659 |
| 3,886,825 A | 6/1975 | Tanaka | 83/13 |
| 3,898,899 A | 8/1975 | Weinstein | 83/29 |
| 3,965,786 A | 6/1976 | D'Luhy | 83/346 |
| 3,975,976 A | 8/1976 | Prentice | 83/556 |
| 3,977,283 A | 8/1976 | Helm | 83/341 |
| 4,004,479 A | 1/1977 | Bodnar | 83/345 |
| 4,020,724 A | 5/1977 | Quinlan | 83/346 |
| 4,127,265 A | 11/1978 | Wirz et al. | 271/260 |
| 4,187,752 A * | 2/1980 | Chesnut | 83/663 |
| 4,191,076 A * | 3/1980 | Bollmer et al. | 83/13 |
| 4,226,150 A | 10/1980 | Reed | 83/346 |
| 4,233,873 A | 11/1980 | Jessen | 83/652 |
| 4,237,786 A | 12/1980 | Sanford | 101/378 |
| 4,270,910 A | 6/1981 | Himmelsbach | 493/373 |
| 4,289,492 A | 9/1981 | Simpson | 493/371 |
| 4,402,265 A | 9/1983 | Pickard | 101/382 MV |
| 4,450,740 A | 5/1984 | Chapman, Jr. et al. | 83/303 |
| 4,537,588 A * | 8/1985 | Ehlscheid et al. | 493/342 |
| 4,549,454 A | 10/1985 | Yamashita | 83/27 |
| 4,553,461 A | 11/1985 | Belongia | 83/344 |
| 4,558,620 A | 12/1985 | Wallis | |
| RE32,128 E | 4/1986 | Blumle | 271/94 |
| 4,594,928 A * | 6/1986 | Thomas et al. | 83/698.41 |
| 4,625,928 A | 12/1986 | Peekna | 242/7.02 |
| 4,645,484 A | 2/1987 | Niske | 493/362 |
| 4,671,152 A | 6/1987 | Blümle | 83/152 |
| 4,676,161 A | 6/1987 | Peekna | 101/378 |
| 4,726,804 A | 2/1988 | Stitcher | 493/223 |
| 4,742,769 A | 5/1988 | Zeller | 101/216 |
| 4,744,297 A | 5/1988 | Sardella et al. | 101/382 MV |
| 4,770,078 A | 9/1988 | Gautier | 83/344 |
| 4,809,609 A | 3/1989 | Sugiura et al. | 101/426 |
| 4,823,659 A * | 4/1989 | Falasconi | 83/100 |
| 4,823,697 A | 4/1989 | Randazzo | 101/375 |
| 4,831,930 A | 5/1989 | Leanna | 101/389.1 |
| 4,842,485 A | 6/1989 | Barber | 416/144 |
| 4,848,202 A * | 7/1989 | Crampton | 83/698.41 |
| 4,878,407 A | 11/1989 | Harrison et al. | 83/13 |
| 4,920,630 A | 5/1990 | Leanna | 29/521 |
| 4,920,843 A * | 5/1990 | Stromberg et al. | 83/346 |
| 4,982,639 A | 1/1991 | Kirkpatrick | 83/659 |
| 5,003,854 A | 4/1991 | Capdebosco | 83/331 |
| 5,005,816 A | 4/1991 | Stemmler et al. | 270/39 |
| 5,074,180 A | 12/1991 | Mayer et al. | |
| 5,095,830 A | 3/1992 | Love | 101/28 |
| 5,109,741 A | 5/1992 | Fuchs | 83/100 |
| 5,119,707 A | 6/1992 | Fischer | 83/698 |
| 5,138,923 A * | 8/1992 | Kent et al. | 83/665 |
| 5,186,108 A | 2/1993 | Hillebrand | 101/415.1 |
| 5,211,096 A | 5/1993 | Steidinger | 83/674 |
| 5,230,271 A | 7/1993 | Hardisty et al. | 83/698 |
| 5,373,758 A | 12/1994 | Gerhardt | 76/107.8 |
| 5,555,786 A | 9/1996 | Fuller | 83/663 |
| 5,570,620 A | 11/1996 | Okonski et al. | 83/152 |

* cited by examiner

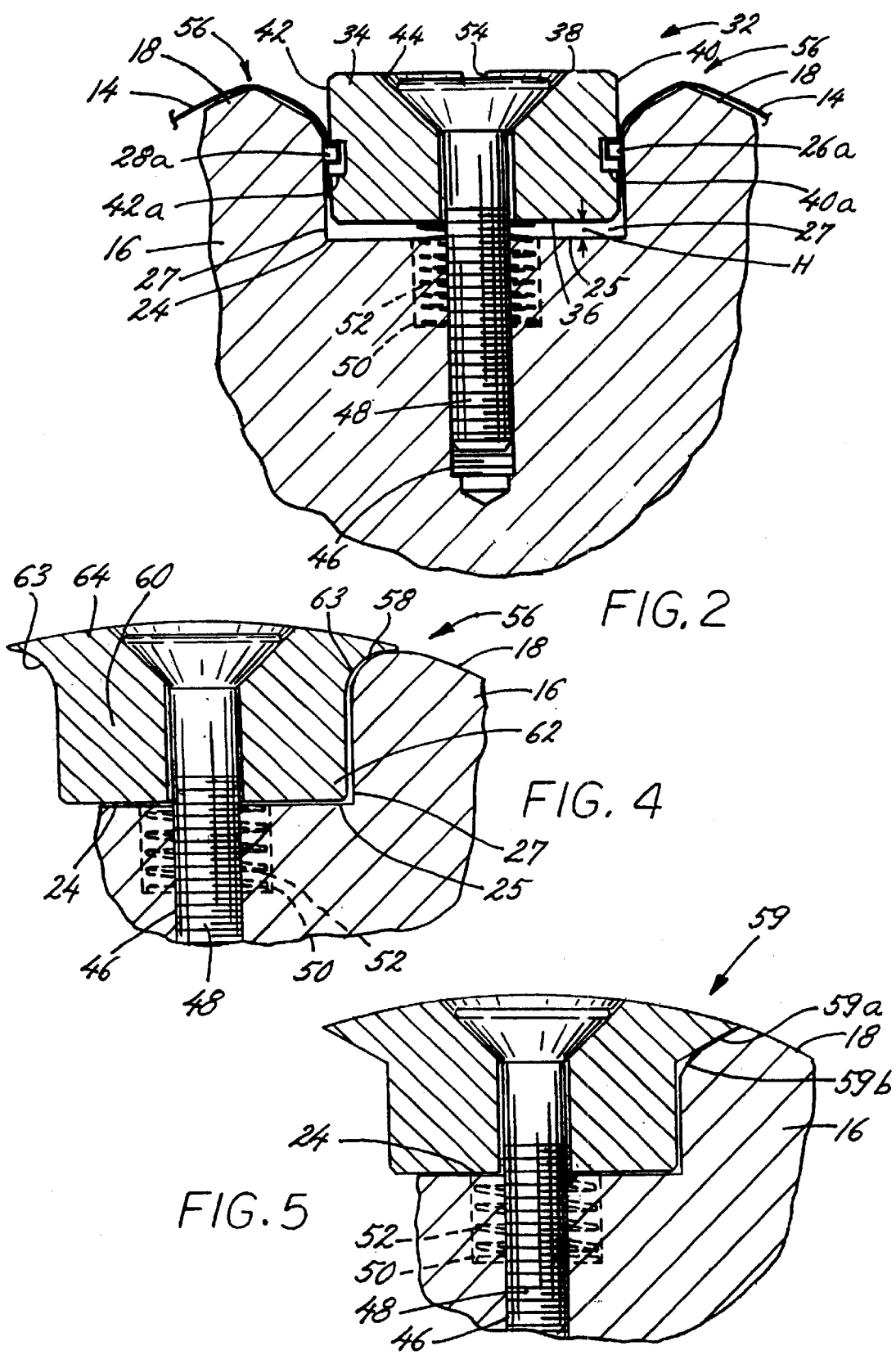

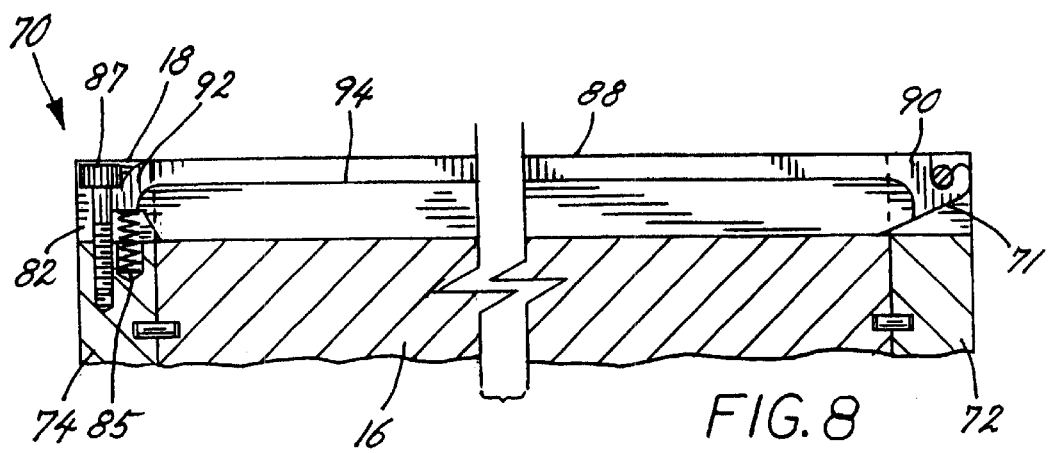
FIG. 8
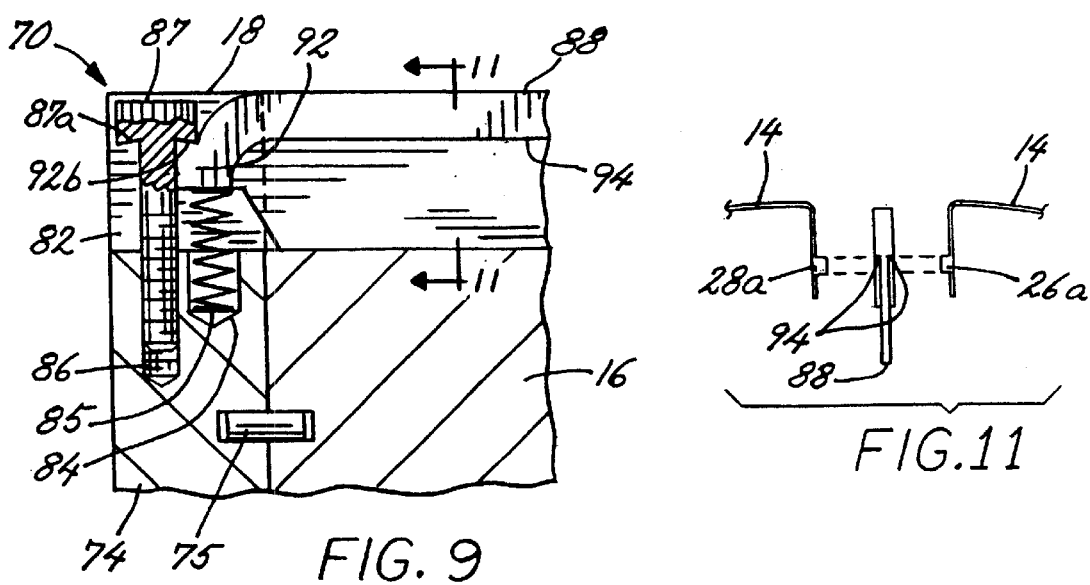
FIG. 9
FIG. 11
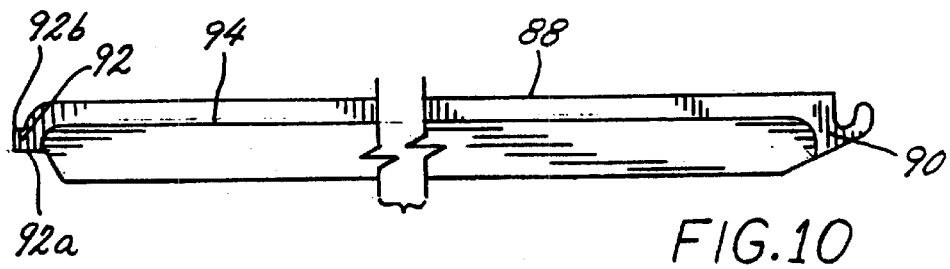
FIG. 10

CUTTING DIE CLAMPING MECHANISM

RELATED APPLICATIONS

This is a continuation-in-part of application Ser. No. 08/184,654 filed Jan. 21, 1994, now abandoned.

FIELD OF THE INVENTION

The present invention relates generally to a rotary cutting device for the cutting of windows, notches, cavities, orifices or other patterns in relatively thin, flexible sheet-like material in either sheet or web form and, more particularly, to a clamping mechanism for retaining a cutting die adjacent to a die holder surface.

BACKGROUND OF THE INVENTION

U.S. Pat. No. 4,823,659 to Falasconi having common ownership herewith describes one embodiment of a conventional rotary panel cutting apparatus for cutting windows, notches, cavities, orifices or other patterns in relatively thin, flexible sheet-like material typically found in either sheet or web form. The cutting apparatus may be used to produce envelopes having a transparent panel or window for allowing visual inspection of the enclosure. The window envelopes are manufactured from a web of material which is initially cut into blanks having a predetermined shape. A panel is subsequently cut from the blank to form the window. Thereafter, the blank is then folded, gummed, printed and packaged to form the finished envelope.

The cutting apparatus comprises a cutting tool in the form of a cutting plate or die and a rotary die holder which brings the cutting die into successive contact with the web and the blanks which advance on a conveyor system. The cutting die has a raised cutting edge which is adapted to engage the paper and cut a pattern such as the envelope sides or panels in the material. The die holder, sometimes called a die cylinder or drum, is mounted for rotation on a drive shaft synchronized with the conveyor system so that the cutting die engages a different blank for each rotation of the die holder.

Unfortunately, the prior art clamping mechanisms for holding a cutting die adjacent to the die holder surface suffer from numerous drawbacks. The typical clamping mechanism has at least one groove disposed around the periphery of the die holder for receiving a clamping key. The clamping key and the groove cooperate to clamp one of the cutting die ends therebetween for securing the cutting die to the holder. A second clamping key and groove may secure the other cutting die end. The cutting die must be retained adjacent the die holder surface, without any slack, to properly operate. The length of the cutting die typically must be manufactured within very strict tolerances, typically measured on the order of 0.001 inches in order to correctly align the cutting die, the clamping key and the groove. If the cutting dies are improperly manufactured, they will not fit. Cutting dies which are too short will not fit between the grooves whereas cutting dies which are too long will result in slack between the cutting die and the die holder surface instead of laying adjacent to the die holder surface resulting in inaccurate and improper cutting alignmenl Unfortunately, many conventional clamping mechanisms can not accommodate even slight variations in the cutting die dimensions. In addition, many clamping mechanisms secure the holding key to the groove using a plurality of screws which are expensive to manufacture and time consuming to assemble and disassemble. In some instances, the clamping action between the holding key and groove is insufficient to hold cutting die during the cutting operation so that the position of the cutting die may slip, resulting in improper and inaccurate cuts.

OBJECTS AND SUMMARY OF THE INVENTION

It is an object of the invention is to provide an improved cutting tool for cutting patterns in sheet-like material.

It is an object of the invention to provide a cutting tool having an improved clamping mechanism for holding the cutting die adjacent to the surface of the die holder.

It is a more specific object of the invention to provide an improved clamping mechanism which compensates for variations in the dimensions of the cutting die.

It is another object of the invention to provide a clamping mechanism which enhances the clamping force between the clamping bar and the die holder groove in order to secure retain the cutting die during the cutting operation.

It is an object of the invention to provide a die holder which functions in an efficient manner, is easily assembled and is adapted for operation with different size cutting dies.

It is a related object of the invention to provide a clamping mechanism which may be easily and readily adjusted to position the cutting die. In accordance with one aspect of the invention, a novel clamping assembly is provided for adjustably retaining the cutting die adjacent to the die holder. The clamping mechanism cooperates with a groove in the die holder for receiving at least one of the ends of the cutting die therebetween for securing the cutting die to the holder. In one embodiment, the clamping mechanism comprises a clamping bar and a position adjustment assembly for adjusting the vertical position of the clamping bar in the groove so as to accommodate different size cutting dies. The clamping mechanism comprises a biasing member disposed between the clamping bar and the groove for resiliently forcing the clamping bar outwardly and a retaining member for forcing the clamping bar inwardly. Once the clamping bar receives the end of the cutting die, the vertical position of the clamping bar in the groove may be adjusted to insure that the cutting die is properly seated on the die holder surface and that there is no slack between the cutting die and the die holder surface.

In another embodiment, the clamping mechanism comprises a clamping bar having a free end and a pivot end pivotably connected to the die holder so that clamping bar may pivotably enter the slot in the die holder. The clamping mechanism has one or more retaining members for retaining the free end after the clamping bar engages the slot. In yet another embodiment, the present invention provides a two-piece clamping bar with a pivot on each end and the retaining free ends are clamped at the center of the die holder longitudinal face. These and other features and advantages of the invention will be more readily apparent upon reading the following description of a preferred exemplified embodiment of the invention and upon reference to the accompanying drawings wherein:

BRIEF DESCRIPTION OF THE DRAWINGS

FIG. 2 is a sectional view of the clamping mechanism taken along line 2—2 in FIG. 1;

FIG. 4 is an elevational view of one embodiment of a spacer key mounted on the die holder;

FIG. 5 is an elevational view of a second embodiment of a spacer key mounted on the die holder;

FIG. 8 is a sectional view of the clamp mechanism taken along line 8—8 in FIG. 6;

FIG. 9 is an enlarged sectional view of the flange end of the clamping bar mounted on the die holder in FIG. 8;

FIG. 10 is a side view of the clamping bar;

FIG. 11 is an exploded view of the clamping bar receiving both ends of the cutting die;

While the invention will be described and disclosed in connection with certain preferred embodiments and procedures, it is not intended to limit the invention to those specific embodiments. Rather it is intended to cover all such alternative embodiments and modifications as fall within the spirit and scope of the invention.

DETAILED DESCRIPTION OF THE PREFERRED EMBODIMENT

Figure 1:
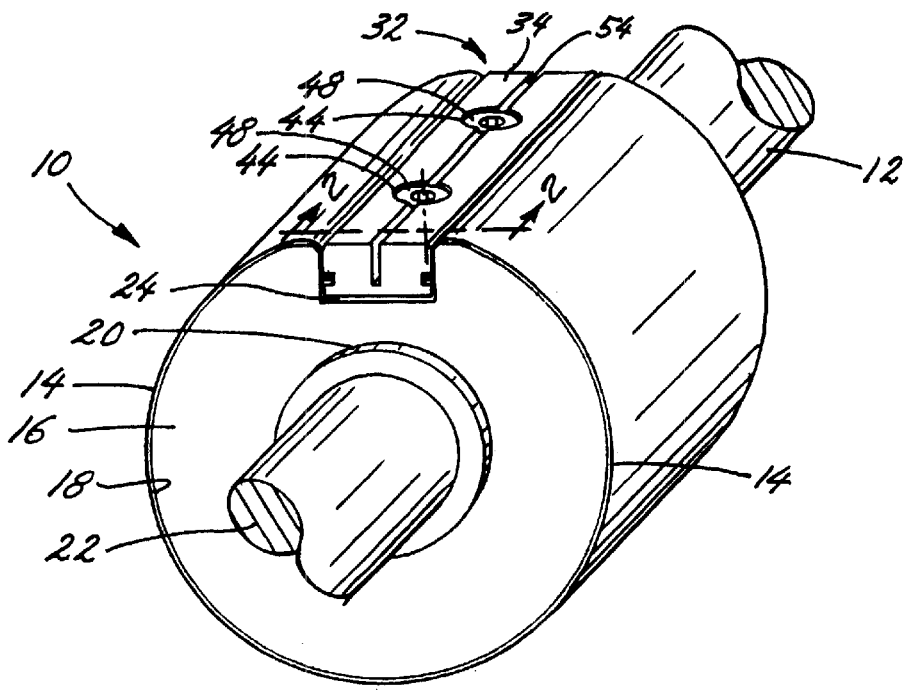
FIG. 1 is a perspective view of one embodiment of a clamping mechanism mounted on a die holder in accordance with the present invention, the clamping mechanism having one clamping bar.

Referring to the drawings and more particularly to FIGS. 1–2, one embodiment of a rotary cutting tool 10 for cutting patterns from sheet-like material such as paper and the like is mounted on a drive shaft 12 in accordance with the present invention. The cutting tool 10 comprises a cutting die 14 mounted on a die holder 16. The drive shaft 12 rotates the die holder 16 so that the cutting die 14 engages a different material blank for each rotation of the die holder 16.

Figure 14:
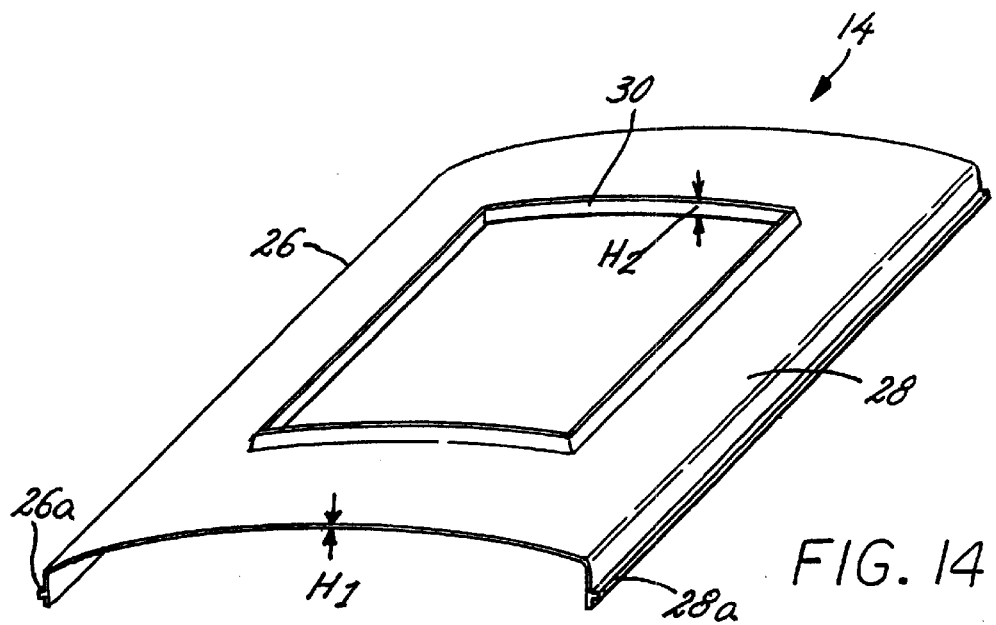
FIG. 14 is a perspective view of one embodiment of a cutting die.

The rotary die holder 16 is adapted for holding the cutting die 14 in selected positions around its outer surface 18. The die holder 16 defines a cylindrical shape and a central bore 20 adapted to receive the drive shaft 12. The die holder 16 has a longitudinal axis 22 generally extending along the axis of the drive shaft 12. The die holder 16 should have at least one groove 24, extending along the axis 22, defined by a floor 25 and opposing side walls 27 as best shown in FIG. 1. The cutting die 14 is a flexible sheet of metal which, as shown in FIG. 14, has a leading end 26 and a trailing end 28 for selectively and releasably attaching to the die holder 16. Each end 26, 28 has a corresponding lip 26a, 28a which is adapted to engage a conventional clamping key (not shown). The cutting die 14 has a raised cutting edge 30 having a contour corresponding to the outline of the pattern to be cut in the material blank or web. In the illustrated embodiment, the cutting die 14 has a rectangular contour to cut a rectangular window panel from an envelope blank although the cutting edge 30 may have other appropriate shapes and patterns known to those skilled in the art including, for example, a cutting edge 30 adapted to cut the sides of an envelope blank. The cutting die 14 may be manufactured from any suitable flexible material including, for example, stainless steel or carbon steel or the like. The thickness of cutting die 14 will typically be from about 0.003–0.033 inches at H1 and from about 0.005–0.050 at the cutting edge H2, but may vary depending upon the application.

In accordance with certain objects of the present invention, an adjustable clamping mechanism is provided which is adapted to cooperate with the groove 24 to clamp at least one of the ends 26 or 28 of the cutting die 14 therebetween. In the embodiment of the clamping mechanism 32 illustrated in FIGS. 1–2, the clamping mechanism 32 engages the leading and trailing ends 26, 28 of the cutting die 14 and may be adjusted to accommodate variations in the distance between the opposing lips 26a and 28a. The clamping mechanism 32 insures that the cutting die 14 is securely retained adjacent the surface 18 of the die holder 14, thereby preventing the cutting die 14 from becoming slack and interfering with the cutting operation.

The embodiment of the clamping mechanism 32 illustrated in FIGS. 1–2 comprises a rectangular clamping bar 34 which is adapted to engage the rectangular groove 24.

The clamping 34 bar has a bottom side 36, a top side 38 and opposing sides 40, 42. The opposing sides 40, 42 are adapted to engage either the leading end 26 or the trailing end 28 and have slots 40a and 42a (or shoulders 94 as shown in FIG. 11) adapted for receiving the lips 26a, 28a of the cutting die 14. In order to secure the clamping bar 34 in the groove 24, the clamping bar 34 and the groove 24 have a plurality of corresponding holes 44, 46 respectively, which cooperate with screws 48. The groove 24 also has a plurality of holes 50 which are adapted to receive resilient biasing members 52 such as a coiled spring. After the biasing members 52 are compressed between the clamping bar 34 and the groove 24, the biasing members 52 ease disassembly of the clamping bar 34 from the die holder 16 by ejecting the clamping bar 34 from the groove 24 when the screws 48 are released.

In order to assemble and operate the clamping mechanism 32, the biasing members 52 are placed in the groove holes 50 and the clamping bar 34 is loosely placed in the groove 24. The biasing members 52 will generally force the clamping bar 34 upwardly so that the slots 40a, 42a in the opposing sides 40, 42 are generally above the surface 18 of the die holder 16 and accessible. The leading end 26a of the cutting die 14 is disposed between the clamping bar side 40 and the groove wall 27 so that the clamping bar slot 40a receives the cutting die lip 26a as best shown in FIG. 2. Subsequently, the cutting die 14 is disposed around the periphery of the die holder 16 so that the trailing end 28 engages the opposing side 42 of the clamping bar 34. The trailing end 28 is similarly disposed between sides of the clamping bar 34 and the groove 24 so that the clamping bar slot 42a receives the trailing end lip 28a as also shown in FIG. 2. It will be appreciated that the clamping mechanism 32 has not yet been tightened so that there will be some slack between the cutting die 14 and the surface 18 of the die holder 16.

In order to securely retain the cutting die 14, the screws 48 are tightened, forcing the clamping bar 34 downwardly into the die holder groove 24. The engagement between the slots 40a, 42a and the lips 26a, 28a permits the clamping mechanism to extend the cutting die 14 about the periphery of the die holder surface 18. By vertically adjusting the height H of the clamping bar 34 in the groove 24, the clamping mechanism may be selectively adjusted to remove any slack between the cutting die 14 and the die holder surface 18, thereby insuring that the cutting die 14 is properly seated adjacent to the surface 18. The clamping mechanism 32 effectively extends the cutting die 14 to remove any slack between the cutting die 14 and the die holder surface 18. If the dimension between the opposing lips 26a and 28a is relatively short, the clamping bar 34 may be raised to engage the lips 26a and 28a so that the height H of the clamping bar 34 will be relatively high. In contrast, if the dimension between the opposing lips 26a and 28a is relatively large, the clamping bar 34 is tightened downwardly so as to extend the cutting die 14 and remove any slack between the cutting die 14 and the die holder surface 18.

In accordance with certain objects of the present invention, the clamping mechanism 32 is adapted to enhance the clamping action between the clamping bar 34 and the die holder groove 24. Referring to FIGS. 1–2, it will be seen that the clamping bar 34 has a slot 54 which is generally disposed in the middle of the top side 38 and which extends substantially along the length of the clamping bar 34. The slot 54 separates the clamping bar 34 into left and right sides (as viewed in the figures) so that the downward movement of the screws 48 force each side of the clamping bar 34 outwardly into engagement with the groove walls. Thus, it will be appreciated that the downward movement of the screws 48 will enhance the clamping force exerted on the ends 26 and 28 of the cutting die 14 by the clamping bar 34 and the groove 24. Although the cutting die 14 is typically made of a relatively flexible metal material, it has been found that the cutting die 14 may be damaged if the shoulder, generally referenced as 56, formed by juncture between the die holder surface 18 and the groove side walls 27, is too sharp. In order to prevent damage to the cutting die 14, the clamping mechanism 32 comprises a groove 24 having a shoulder 56 which is shaped to permit the cutting die 14 to bend without damage. In one embodiment, the shoulder 56 may have a substantially arcuate cross-section 58 such as illustrated in FIG. 4. The arcuate shoulder 58 permits the cutting die 14 to bend without damage. Although an arcuate cross section is illustrated in FIG. 4, it will be appreciated that the shape and dimensions of the shoulder 56 of the groove 24 may vary depending upon the size of the groove 24 and the die holder 16 and the composition of the cutting die 14.

FIGS. 1–3 and 5 illustrate another embodiment of a shoulder 59 which has a plurality of inclined planes 59a which effectively create a gradual curvature in the shoulder 59, permitting the cutting die 14 to bend without damage.

FIGS. 4 and 5 also illustrate holding keys 60 and 62, respectively, which cooperate with the groove 24 to provide the die holder 16 with a substantially smooth and continuous outer surface 18 when the clamping mechanism 32 and/or cutting die 14 is not used. The holding keys 60 and 62 provide a substantially even surface 18 for receiving the blank and for keeping the die holder 16 properly weighted and balanced during rotation. The holding key 60 illustrated in FIG. 4 has substantially rectangular bottom portion 62 for engaging the groove 24, a flange portion 63 having an arcuate cross section which is adapted to correspond with the arcuate shoulder 58 of the groove 24 and a top surface 64 also having an arcuate cross section to provide a substantially continuous and curved outer surface 18. The holding key 62 of FIG. 5 is similar to the holding key 60 except that the flange portion 66 has an inclined portion 66a which is adapted to engage the inclined shoulder 59a. In the embodiment of the clamping mechanism 32 illustrated in FIGS. 1–2, a single clamping bar 34 is adapted to clamp both the trailing and leading ends 26, 28 of the cutting die 14.

Figure 3:
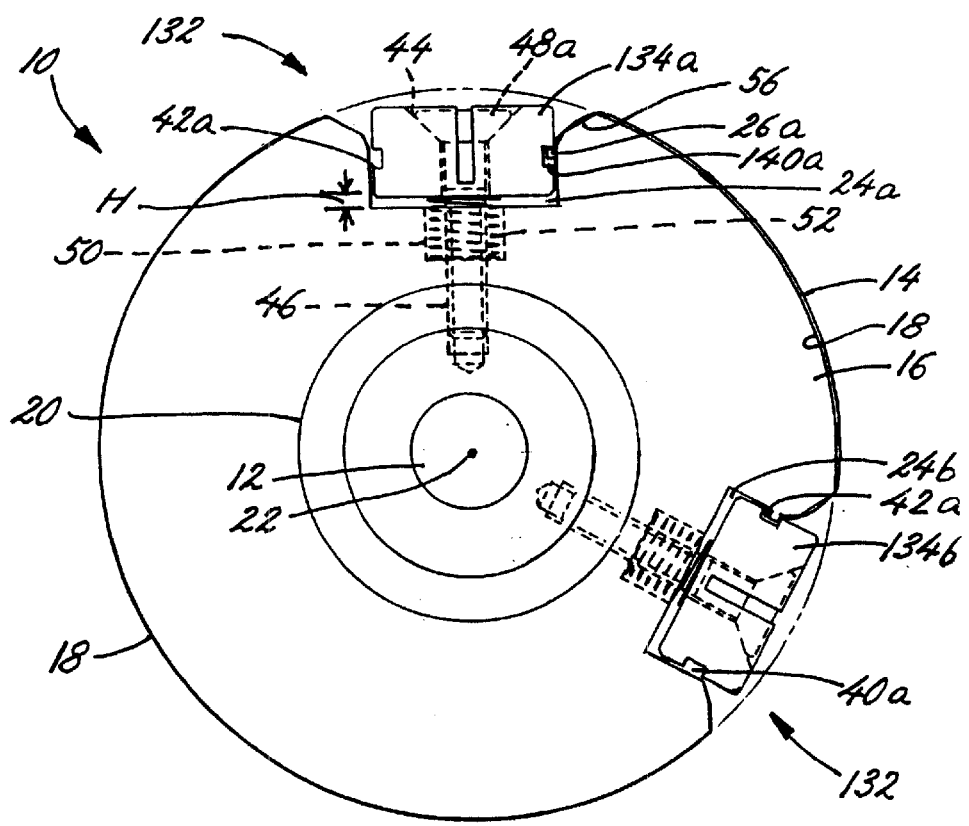
FIG. 3 is an elevational view of another embodiment of the clamping mechanism shown in FIG. 1 wherein the clamping mechanism has two clamping bars.

FIG. 3 illustrates another embodiment of the clamping mechanism 132 which comprises more than one clamping bar 134 disposed along the periphery of the die holder 16. The individual clamping bars 134 operate in the same manner as the first embodiment except that a first clamping bar 134a is adapted to securely retain the leading end 26 of the cutting die 14 while a second clamping bar 134b is adapted to engage the trailing end 28 of the cutting die 14. The clamping mechanism 132 may be adapted to hold different size dies by placing any number of clamping bars 134 around the periphery of the die holder 16.

In order to assemble the cutting die 14, the leading edge 26 is disposed between the first clamping bar 134a and the groove 24a so that the clamping bar slot 140a receives the cutting die lip 26a, and the screws 48a are tightened. The trailing end 28 is similarly disposed between the second clamping bar 134b and the groove 24b. By adjusting the vertical position of the individual clamping bars 134, the clamping mechanism 132 accommodates variations in the cutting die dimensions and insures that cutting die 14 is taut against the die holder surface 18.

Figure 6:
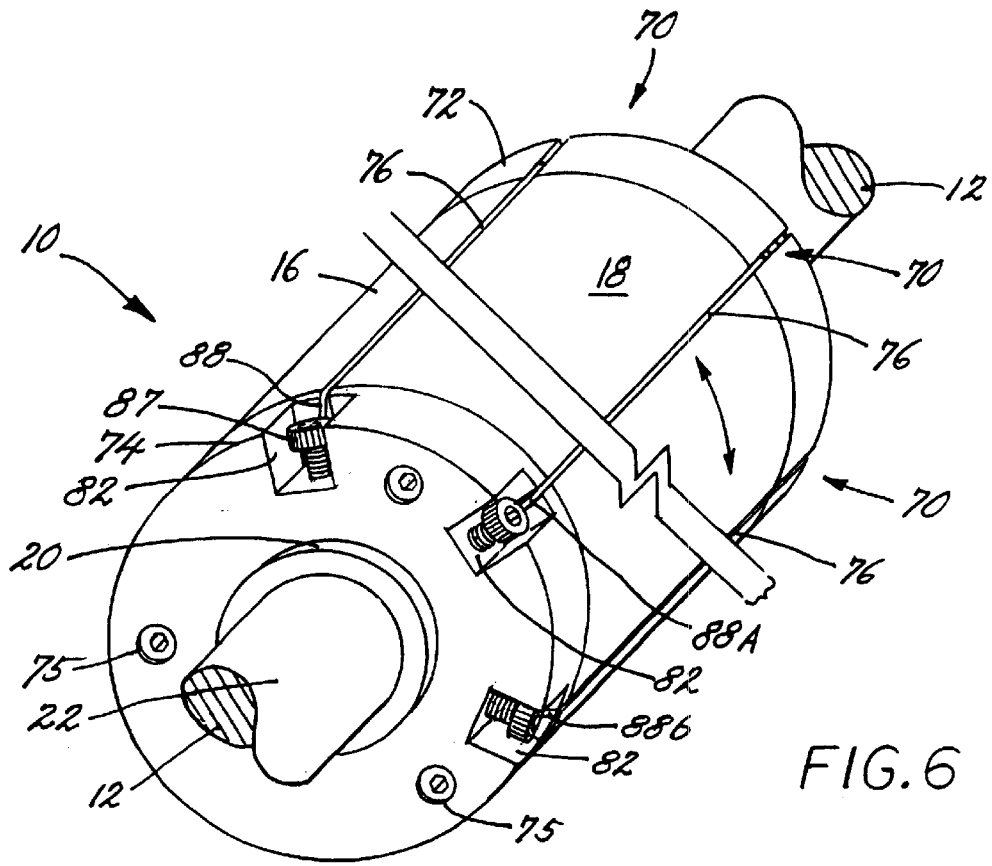
FIG. 6 is a perspective view of a third embodiment of the clamping mechanism mounted on a die holder in accordance with the present invention.

Other embodiments of the clamping mechanism 70 are illustrated in FIGS. 6–13. The illustrated embodiment of FIG. 6 shows the rotary cutter 10 has a central die holder 16 and opposing end plates 72, 74 which are attached to the die holder 16 using attachment members 75 such as screws. The die holder 16 has a plurality of slots 76 disposed around the peripheral surface 18. One end 77 of the slot 76 communicates with a pivot pin 80 (shown in phantom in FIG. 7) disposed in the one of the end plates 72. Although the pivot pin is disposed on the end plate, it will be appreciated that the pin may be disposed in die holder 16 in other embodiments. The other end 78 of the slot 76 communicates with a chamber 82 in the other end plate 74. Although the chamber 82 may be disposed in the die holder 16, it is preferred that the chamber 82 be disposed in the end plate 74 so that the surface area of the die holder 16 is maximized and continuous for receiving the blank. The chamber 82 has two holes 84 and 86 as best shown in FIG. 9. The first hole 84 is adapted to receive a biasing member 85 such as a coiled spring and the second hole 86 is adapted to receive an attachment member 87 such as a screw. The clamping mechanism 70 comprises a clamping bar 88 which is adapted to pivotably and slidably engage the slot 76. One end of the clamping bar 88 has a hook member 90 which is adapted to pivotably engage the pivot pin 80. The hook member 90 may have any physical configuration which permits the clamping bar to pivotably engage the slot 76. The other end of the clamping bar 88 has a flange member 92. Referring to FIGS. 10–11, the bottom portion of the clamping bar 88 forms a shoulder 94 disposed between the ends 90 and 92 of the clamping bar 88 which is adapted to receive one of the cutting die lips 26a or 28a. The shoulder 94 should be disposed on at least one side of the bar 88 and, preferably on both sides as shown in FIG. 11.

In order to assemble the clamping mechanism 70 and mount the cutting die 14 to the die holder 16, the hook member 90 is inserted into the slot 76 so that the hook member 90 hookedly engages the pin 80 for pivotable movement. It is preferred that the end of the slot 76 have an inclined ramp surface 71 to assist the hook member 90 in hooking the pin 80.

The leading end 26 of the cutting die 14 is disposed between the clamping bar 88 and the slot 76 so that the cutting die lip 26a engages the clamping bar shoulder 94. It will be appreciated that the cutting die 14 will be securely retained between the clamping bar 88 and the slot 76 after the clamping bar 88 is pivotably inserted into the slot 70.

In order to secure the clamping bar 88 in the slot 76, the flange end 92 of the clamping bar 88 is pivotably inserted into the chamber 82. Referring to FIG. 10, the bottom side 92a of the flange member 92 engages the biasing member 85. The biasing member 85 acts to eject the flange member 92 and the clamping bar 88 above the surface 18 of the die holder 16 for ease of access. By pushing the clamping bar 88 downwardly, the flange member 92 compresses the biasing member 85 and is disposed below the die holder surface 18. The retaining member 87 is inserted into the hole 86 and tightened, thereby retaining the flange member 92 below the die holder surface 18. It is preferred that the flange member 92 and the retaining member 87 have cooperating inclined surfaces 92b, 87a, respectively, to assist in securing the clamping bar 88 in the slot 76. Although the illustrated embodiment of the retaining member 87 is a screw, the retaining member 87 may have any physical configuration including, for example, a latch, hook or the like which is adapted to secure the clamping bar 88 against the upward force of the biasing member 85.

Figure 7:
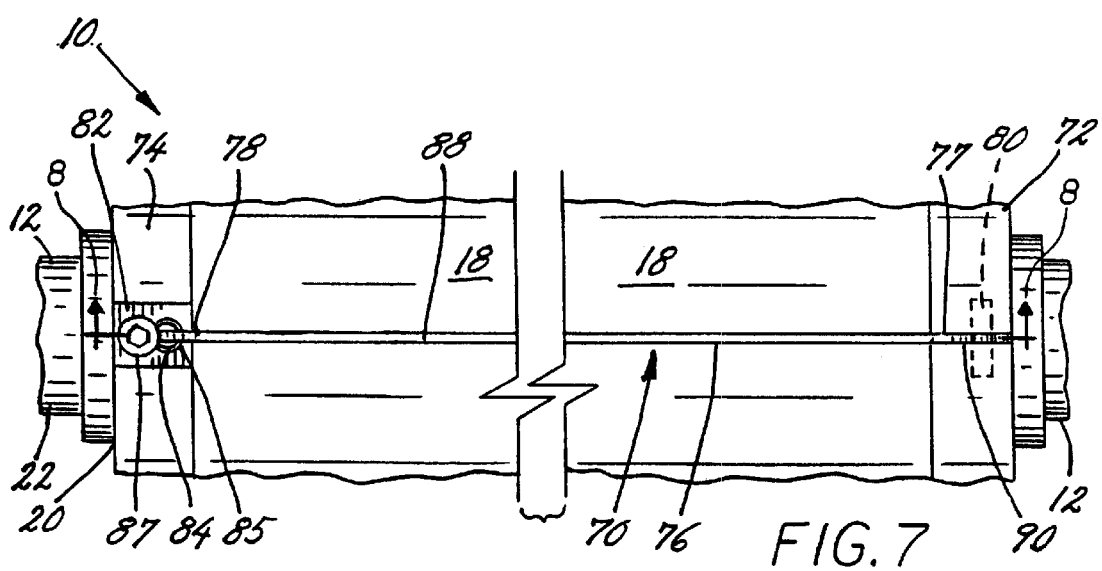
FIG. 7 is a top view of the clamping mechanism and die holder in FIG. 6.
Figure 7B:
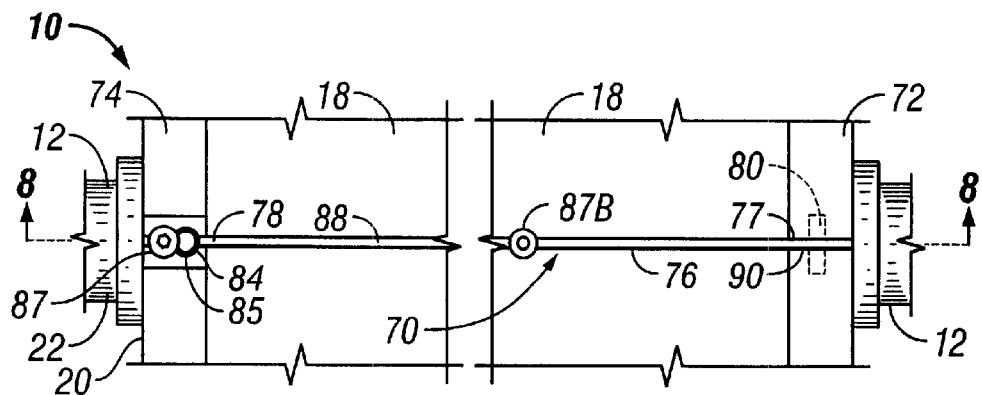
FIG. 7B is a top view of the clamping mechanism and die holder of FIG. 7, with an additional clamping member.

As shown in FIG. 7B, provisions are made for a second retaining member 87b to be placed at a predetermined location of the clamping bar 88 to aid in further clamping. The mode of attachment to the cutting die holder 16 is identical with that of the clamping member 87 situated at the end plate 74. A biasing member 85b may be utilized with the retaining member 87b.

Figure 8B:
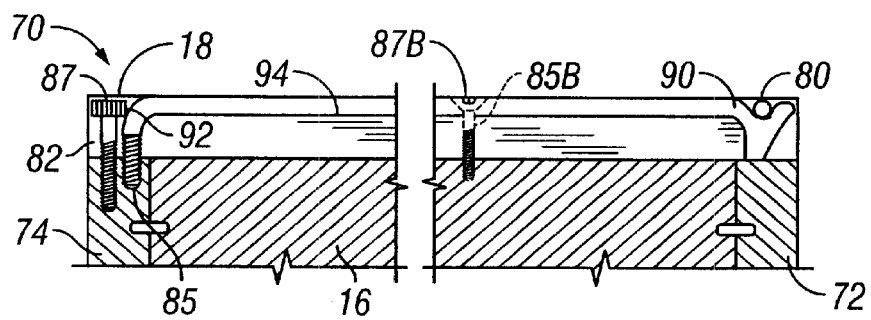
FIG. 8B is a sectional view of the clamping mechanism of FIG. 7B taken along lines 8—8.

FIG. 8B is a side view of FIG. 7B, further detailing an optional center biasing member (e.g., spring) 85b.

Figure 10B:
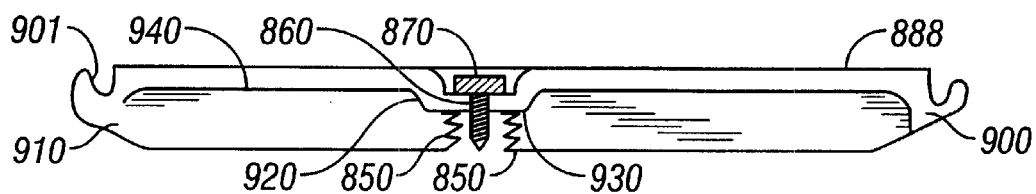
FIG. 10B is a side view of a clamping bar having a hook on both ends of the clamping bar and a clamping flange in the center of the clamping bar.

In yet another embodiment of the present invention, a two piece clamping bar 888 is envisioned. As shown in FIG. 10B, the clamping bar 888 has two hook ends, 900 and 901, one at each end of the clamping bar 888. Two corresponding flange ends 920, 930 cooperatively meet at a hole 860 that receives a clamping member 870. As in previous embodiments, each flange end can be used in conjunction with a biasing member 850. The operation of the clamping bar of this embodiment is similar to the one piece design of FIG. 10, but is held in place substantially in the longitudinal center of the cutting die holder 16, after each hook end 901, 900 cooperates with its corresponding pin 80.

In some applications, the trailing end 28 of the cutting die 14 may be disposed around the die holder 16 so that the trailing end 28 engages the same clamping bar 88 as generally shown in FIG. 11. In such applications, the same clamping bar 88 may be utilized to hold both the trailing and leading ends 26, 28 of the cutting die 14.

Figure 12:
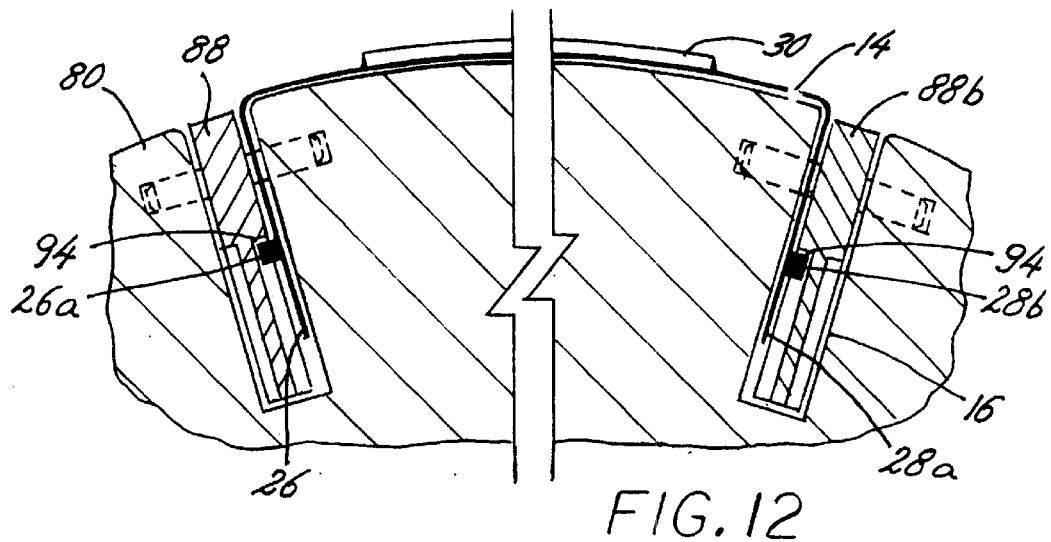
FIG. 12 illustrates the die holder and two clamping bars wherein each clamping bar receives one end of the cutting die.
Figure 13:
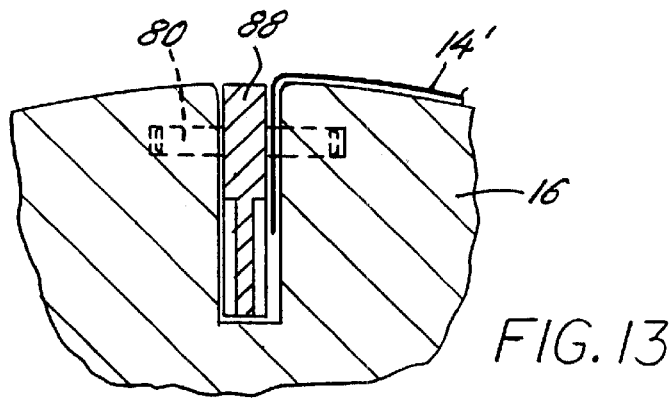
FIG. 13 illustrates the clamping bar receiving one end of the cutting die which does not have a lip.

Referring to FIG. 11, the right shoulder 94 of the clamping bar 88 retains the leading end lip 26a while the left shoulder 94 retains the trailing end lip 28a. It will also be appreciated that only one clamping bar 88 is necessary in applications where only the leading end 26 of the cutting die 14 has to be secured, In other applications as shown in FIG. 12, a first clamping bar 88a may retain the leading end 26 of the cutting die 14 whereas the trailing end 28 of the cutting die 14 may be retained by a second clamping bar 88b. The die holder 16 may have any number of clamping bars which may be disposed anywhere around the periphery of the die holder 16. For illustrative purposes, the embodiment of the die holder 16 illustrated in FIG. 6 has three clamping bars 88, 88a, 88b. The cutting die 14 may be retained by any two clamping bars 88 depending on the length of the cutting die 14. The position of the clamping bar 88 around the periphery of the die holder 16 is determined by the dimensions of the cutting die 14 utilized in a particular application.

Thus, it will be seen that a die cutting apparatus and related clamping mechanisms have been provided which attain the aforenoted objects. Although the structure and operation of the cutting die apparatus has been described in connection with the cutting of envelopes, it is not intended that the invention be limited only to such operations. Various additional modifications of the described embodiments of the invention specifically illustrated and described herein will be apparent to those skilled in the art, particularly in light of the teachings of this invention. The invention may be utilized in the cutting of any pattern from any relatively thin and flexible sheet-like material blank, including, for example, paper, cloth or plastic materials and labels, sanitary napkins, and the like. It is intended that the invention cover all modifications and embodiments which fall within the spirit and scope of the invention. Thus, while preferred embodiments of the present invention have been disclosed, it will be appreciated that it is not limited thereto but may be otherwise embodied within the scope of the following claims.

We claim as our invention:

1. A rotary holder assembly adapted to hold a cutting die to be used for cutting a pattern from a paper blank, the assembly comprising:

a longitudinally extending clamping bar having two ends, a first pivot end and a second free end, said pivot end including a single hook structure;

a cylindrical die holder adapted to rotate about an axis, said die holder having an outer surface, said outer surface having an axially extending slot therein, said slot having a first end and a second end, said slot including a single pivot point, said pivot point being point at said first end, said slot receiving said hook structure of the clamping bar so that the hook structure and the pivot point cooperate to pivotally secure the first end of said clamping bar, said cutting die being adapted to have ends, said clamping bar adapted to secure in said slots at least one of the ends of the cutting die between said first and second ends of the clamping bar when said clamping bar is pivoted into said slot.

2. The assembly of claim 1, wherein said clamping bar further comprises at least one retaining member for retaining the second free end of the clamping bar in said slot.

3. The assembly of claim 2, wherein at least one said retaining member comprises a screw for engaging and retaining the second free end of the clamping bar.

4. The assembly of claim 2, wherein said rotary holder assembly further comprises a biasing member positioned under one of said free end and said pivot ends of said clamping bar.

5. The assembly of claim 4, wherein said biasing member comprises a spring.

6. The assembly of claim 2, wherein said rotary holder assembly further comprises a biasing member positioned under both said free end and said pivot end of said clamping bar.

7. The assembly of claim 6, wherein at least one of said biasing members comprises a spring.

8. The assembly of claim 3, wherein another said retaining member comprises a second screw located between said free end and said pivot end of said clamping bar.

9. The assembly of claim 8, wherein said rotary holder assembly further comprises a biasing member positioned under said second screw.

\* \* \* \* \*